Dec. 28, 1937.  H. E. CANN  2,103,709
STERILIZER
Filed Dec. 5, 1931  2 Sheets-Sheet 1
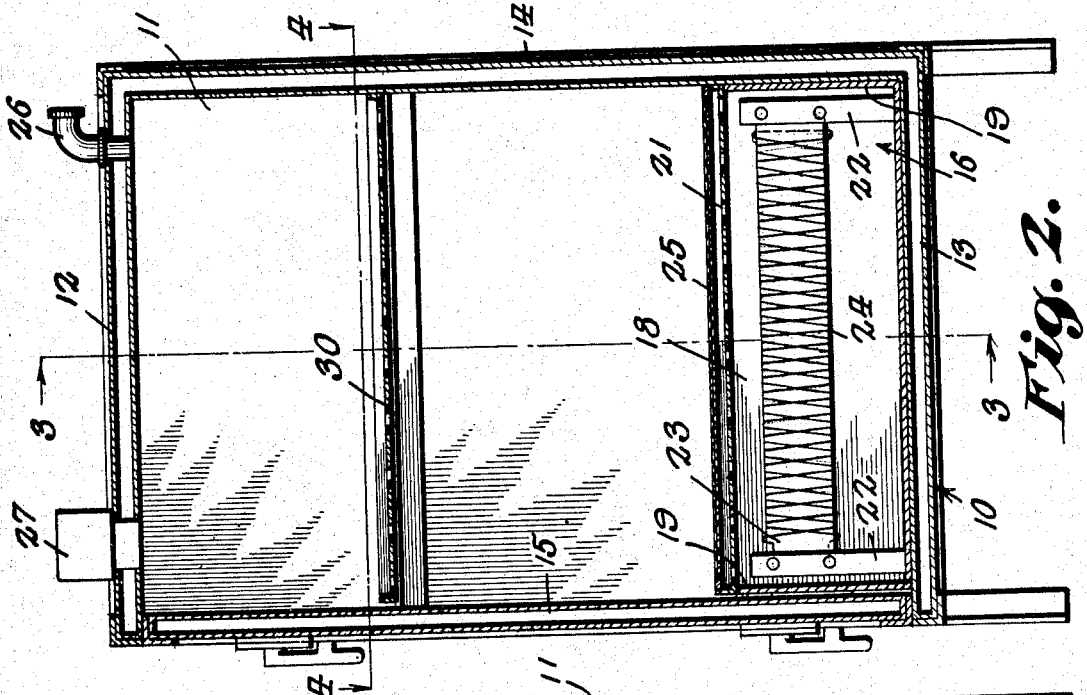
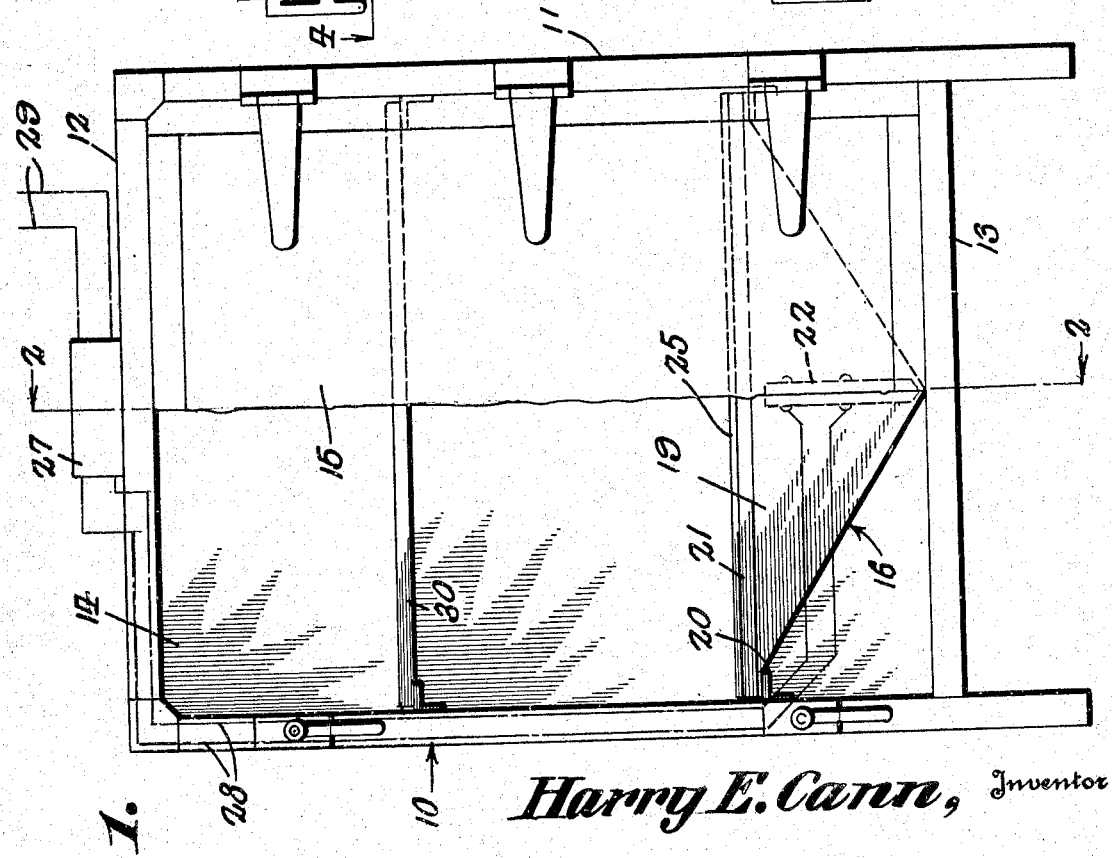
Harry E. Cann, Inventor
By Horace Chandler
Attorney Dec. 28, 1937.  H. E. CANN  2,103,709
STERILIZER
Filed Dec. 5, 1931   2 Sheets-Sheet 2
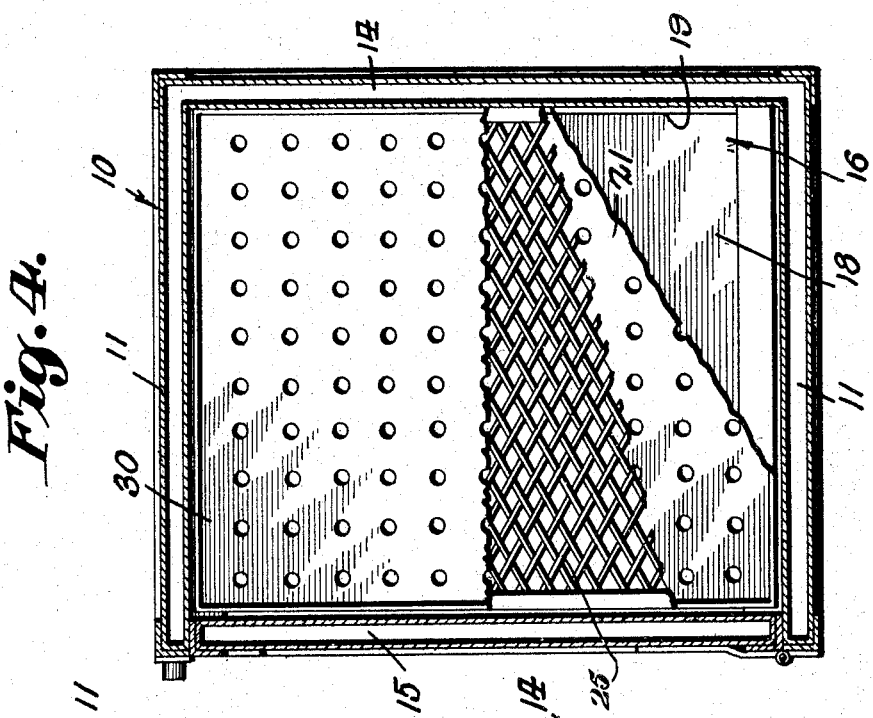
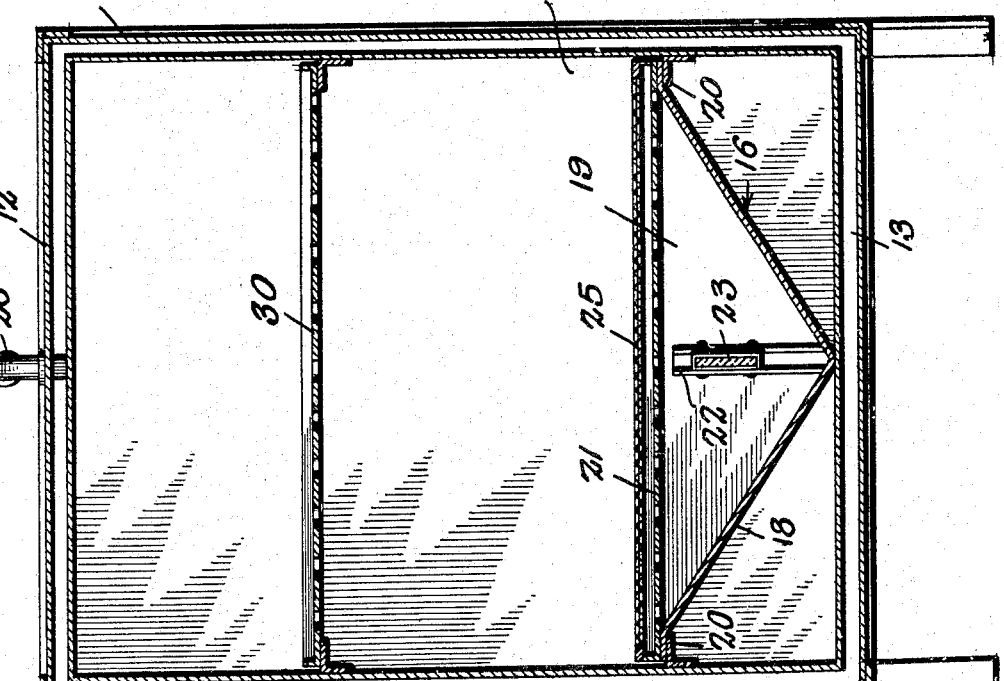
Harry E. Cann, Inventor Patented Dec. 28, 1937

2,103,709

UNITED STATES PATENT OFFICE 2,103,709

STERILIZER

Harry E. Cann, West Chester, Pa.

Application December 5, 1931, Serial No. 579,314

1 Claim. (Cl. 21—93)

This invention relates to new and useful improvements in sterilizing devices, and particularly to devices for sterilizing receptacles and utensils which contained or have come in contact with milk and cream.

It has been found that, when moist, and in the presence of moisture, bacteria will coagulate and die at certain temperatures, and that when dry, and in the absence of moisture, the lethal temperatures are much higher. The melting point of the solder, with which the parts of the commonly used receptacles are secured together, is about 350° F., so that it becomes necessary to maintain the interior of the cabinet below this temperature and, at the same time, produce a condition therein that will destroy bacteria.

It is, therefore, the principal object of the invention to provide a sterilizing device wherein the heated air is brought to a highly humid condition, so that the bacteria will be completely destroyed.

Another object is to provide a sterilizing device wherein the air, which is heated in the lower portion of the device, is humidified, whereby to prevent the too rapid rise of such air, thereby permitting an even distribution of the heat to all parts of the device, at the same time.

Another object is to provide a sterilizing device wherein the moisture, after having served its various purposes, is released through a vent, whereby the receptacles are dried as well as sterilized.

Other objects and advantages will be apparent from the following description when taken in connection with the accompanying drawings.

In the drawings:

Figure 1 is a front elevation of a cabinet made in accordance with the present invention, the door being partly broken away.

Figure 2 is a vertical central sectional view on the line 2—2 of Figure 1.

Figure 3 is a vertical central sectional view on the line 3—3 of Figure 2.

Figure 4 is a horizontal sectional view on the line 4—4 of Figure 2.

Referring particularly to the accompanying drawings, there is shown a cabinet, designated as a whole by the numeral 10, and including the side walls 11, the top and bottom walls 12 and 13, and the rear wall 14, the front being open and provided with the door 15. In the lower portion of the cabinet is located the heating and convection device, designated as a whole by the numeral 16.

The convection device includes the downwardly converging plates 18, the lower edges of which are properly secured together, and have their ends secured to the triangular end plates 19, which plates close the ends of the valley thus formed by said plates. The device 16 is disposed with its ends in the front and rear of the cabinet, and the upper edges of the plates 18 rest on the supports 20, carried by the inner faces of the sides of the cabinet. Disposed transversely within the cabinet is a perforated plate 21, having its lateral edges resting on the upper edges of the plates 18, and its front and rear edges secured to the upper edges of the plates 19. Disposed centrally within the front and rear ends of the valley of the convection device 16 are the vertical posts 22, which have secured thereto the ends of the members 23, carrying the electrical resistance elements 24. Disposed transversely in the cabinet and supported a short distance above the perforated plate 21, is a grating 25, on which the inverted receptacles to be dried are placed.

Secured in the top of the cabinet is a vent pipe 26, through which the vapor is adapted to escape, when the pressure reaches a predetermined degree. Also mounted on the top of the cabinet, although the same may be mounted on a side thereof, is a thermostat 27, of any well known type, the same being connected with the heater 24, by the wires 28, and to a source of electricity by the wires 29.

Mounted within the cabinet, at a suitable height from the bottom thereof, is a perforated shelf 30, on which receptacles and utensils are placed for sterilization, said shelf permitting passage of heated air and steam therethrough. It will be understood that, while I show a single shelf, I may provide as many as the size of the cabinet will accommodate.

In the operation of the device, the operator places a plurality of washed, but undried receptacles and utensils on the grating, and on the shelf, the receptacles being placed in an inverted position. The elements 24 are then raised to the required temperature, by the application of an electric current, with the result that heat is radiated therefrom to heat the plates of the convection device 16. The perforated convection plate 21 becomes very warm, but because of the fact that the receptacles in the lower portion of the cabinet rest on the grating 25, said receptacles are held against direct contact with said plate, and from directly absorbing the heat by conduction. Water from the interiors of the receptacles, as well as from the exteriors thereof, runs down the walls of the receptacles and through the grating 25 onto the convection plate 21 which, as already stated, has become very warm. Such drippings as have not become converted into vapor from the heat of the plate 21, pass through the perforations in that plate and onto the heated plates of the convection device 16 where they become converted into vapor. The vapors thus created serve as a check on the otherwise rapid rise of the heated air, so that the heat is conveyed by convection to the upper portion of the cabinet, thereby permitting the lower portion of the cabinet to be raised to the sterilizing temperature as rapidly as the upper portion, with the result that the general or average temperature of the entire interior of the cabinet is raised more evenly. Any water not becoming vaporized upon striking the plate 21 will drop into the valley therebeneath.

The fact that the dropping water from the receptacles is converted into vapor, serves as a barrier against the too rapid rise of the heated air, to the top of the cabinet, whereby to more effectively produce the complete sterilization of the receptacles. While it may be necessary, at times, to place a small quantity of water in the before-mentioned valley, to be converted into vapor, the drippings from the receptacles are usually sufficient to produce the required amount of vapor, for the proper and complete sterilization of the receptacles. The convection currents of heated air are thus prevented from rising too rapidly to the upper portion of the cabinet, as this would superheat the upper portion of the cabinet before the lower portion could become heated to the sterilizing temperature. Furthermore, the humidified heated air will then have sufficient time to penetrate throughout the lower and middle regions of the interior of the cabinet, and to come into contact with all parts of the receptacles therein, as it ascends to the upper portion of the interior of the cabinet, while at the same time, such heated air will destroy any bacteria which might be contained within the cabinet. In addition, the heated air vaporizes any water or moisture film which may have remained on the surfaces of the receptacles.

By means of the thermostat, the electric current is automatically cut off, when the temperature rises above a predetermined degree.

Any steam which may generate within the cabinet, will pass off through the vent, thus preventing the accumulation of pressure within the cabinet, and also preventing moisture from condensing on the receptacles, when the cabinet becomes cool.

What is claimed is:

A sterilizing device comprising a closed cabinet for receiving previously washed but undried receptacles, converging plates in the lower portion of the cabinet forming a valley for receiving the drippings from inverted receptacles, a horizontal perforated plate above said valley, a reticulated member above said plate for supporting inverted receptacles and through which said drippings are adapted to pass to said perforated plate, and a heating means within said valley for converting said drippings into steam, whereby to retard the rise of heated air so as to produce an even and continuous circulation of heat by convection to all parts of the interior of the cabinet.

HARRY E. CANN.